(12) United States Patent
Gohain et al.

(10) Patent No.: US 12,625,617 B2
(45) Date of Patent: May 12, 2026

(54) DATA SEPARATION CONFIGURATIONS FOR MEMORY SYSTEMS

(71) Applicant: Micron Technology, Inc., Boise, ID (US)

(72) Inventors: Nitul Gohain, Bangalore (IN); Nicola Colella, Capodrise (IT)

(73) Assignee: Micron Technology, Inc., Boise, ID (US)

( * ) Notice: Subject to any disclaimer, the term of this patent is extended or adjusted under 35 U.S.C. 154(b) by 14 days.

(21) Appl. No.: 18/581,191

(22) Filed: Feb. 19, 2024

(65) Prior Publication Data

US 2024/0289031 A1 Aug. 29, 2024

Related U.S. Application Data

(60) Provisional application No. 63/447,778, filed on Feb. 23, 2023.

(51) Int. Cl.
G06F 3/06 (2006.01)
(52) U.S. Cl.
CPC ............ G06F 3/0619 (2013.01); G06F 3/064 (2013.01); G06F 3/0659 (2013.01); G06F 3/0679 (2013.01)
(58) Field of Classification Search
CPC ....... G06F 3/0619; G06F 3/0679; G06F 3/064
See application file for complete search history.

(56) References Cited

U.S. PATENT DOCUMENTS

| | | | | |
|---|---|---|---|---|
| 10,739,996 | B1 * | 8/2020 | Ebsen | ................. G06F 16/1727 |
| 11,416,389 | B2 * | 8/2022 | Akin | ................... G06F 12/0246 |
| 12,099,440 | B1 * | 9/2024 | Sykes | ................. G06F 12/0891 |
| 2018/0307598 | A1 * | 10/2018 | Fischer | ................. G06F 3/0679 |
| 2018/0373428 | A1 * | 12/2018 | Kan | ....................... G06F 3/0616 |
| 2020/0073798 | A1 * | 3/2020 | Cho | ..................... G06F 12/0253 |
| 2020/0183588 | A1 * | 6/2020 | Lee | ...................... G06F 3/0649 |
| 2020/0326871 | A1 * | 10/2020 | Wu | ........................ G06F 3/0647 |
| 2021/0019255 | A1 * | 1/2021 | Akin | ................... G06F 12/0246 |
| 2021/0397550 | A1 * | 12/2021 | Byun | ................. G06F 12/0246 |
| 2022/0405000 | A1 * | 12/2022 | Hong | .................... G06F 3/0652 |

* cited by examiner

*Primary Examiner* — Mark A Giardino, Jr.
(74) *Attorney, Agent, or Firm* — Holland & Hart LLP

(57) ABSTRACT

Methods, systems, and devices for data separation configurations for memory systems are described. A memory system may store one or more characteristics of data, which may be utilized to improve performance associated with transferring the data between blocks of memory cells. For example, a memory system may be configured to evaluate whether to separate data in one or more transfer operations based on the characteristics of the data. Some transfer configurations may include transferring data independent of characteristics of the data and some other transfer configurations may include transferring data based on characteristics of the data. In some examples, a transfer configuration may include transferring data associated with a relatively longer validity duration characteristic before transferring data associated with a relatively shorter validity duration characteristic, which may include transferring data associated with different validity duration characteristics to the same target block or to different target blocks.

20 Claims, 6 Drawing Sheets

Cold data 220          Hot data 230

Warm data 225          No data 235

200

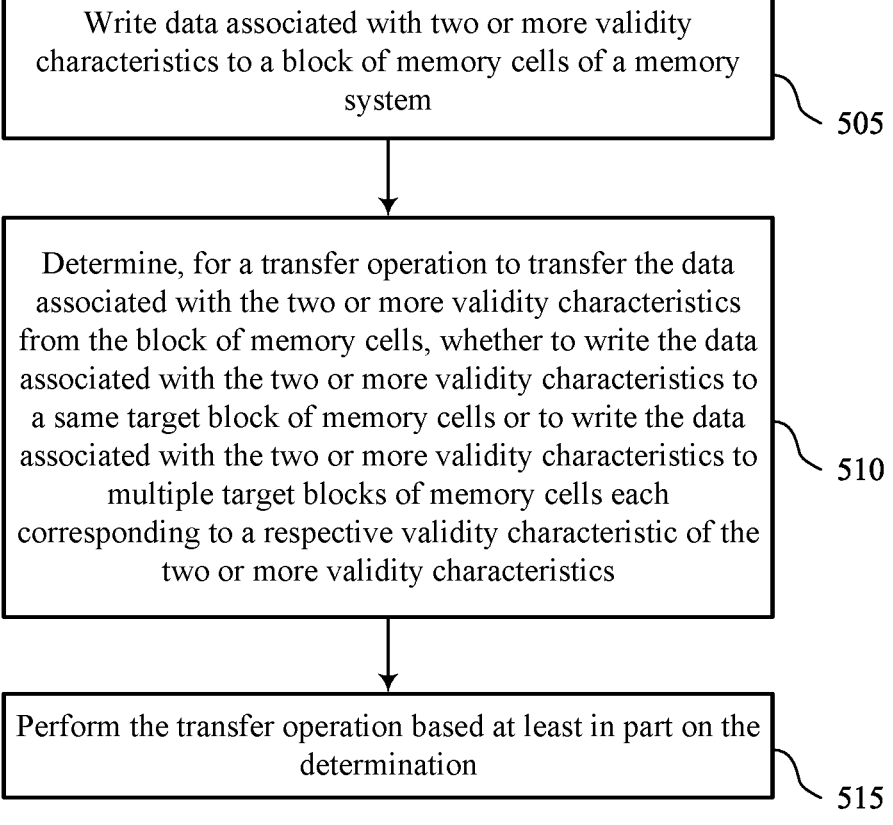

Write data associated with two or more validity characteristics to a block of memory cells of a memory system

505

Determine, for a transfer operation to transfer the data associated with the two or more validity characteristics from the block of memory cells, whether to write the data associated with the two or more validity characteristics to a same target block of memory cells or to write the data associated with the two or more validity characteristics to multiple target blocks of memory cells each corresponding to a respective validity characteristic of the two or more validity characteristics

510

Perform the transfer operation based at least in part on the determination

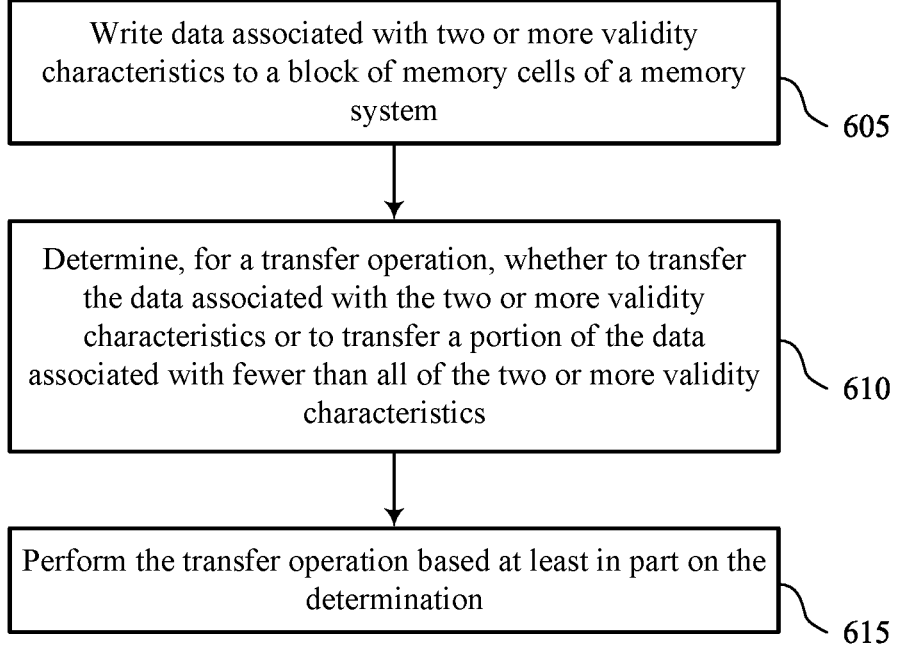

Write data associated with two or more validity characteristics to a block of memory cells of a memory system

605

Determine, for a transfer operation, whether to transfer the data associated with the two or more validity characteristics or to transfer a portion of the data associated with fewer than all of the two or more validity characteristics

610

Perform the transfer operation based at least in part on the determination

DATA SEPARATION CONFIGURATIONS FOR MEMORY SYSTEMS

CROSS REFERENCE

The present Application for Patent claims the benefit of U.S. Provisional Patent Application No. 63/447,778 by GOHAIN et al., entitled "DATA SEPARATION CONFIGURATIONS FOR MEMORY SYSTEMS," filed Feb. 23, 2023, assigned to the assignee hereof, and expressly incorporated by reference in its entirety herein.

TECHNICAL FIELD

The following relates to one or more systems for memory, including data separation configurations for memory systems.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states if disconnected from an external power source.

BRIEF DESCRIPTION OF THE DRAWINGS

FIGS. 5 and 6 illustrate flowcharts showing methods that support data separation configurations for memory systems in accordance with examples as disclosed herein.

DETAILED DESCRIPTION

Figure 1:
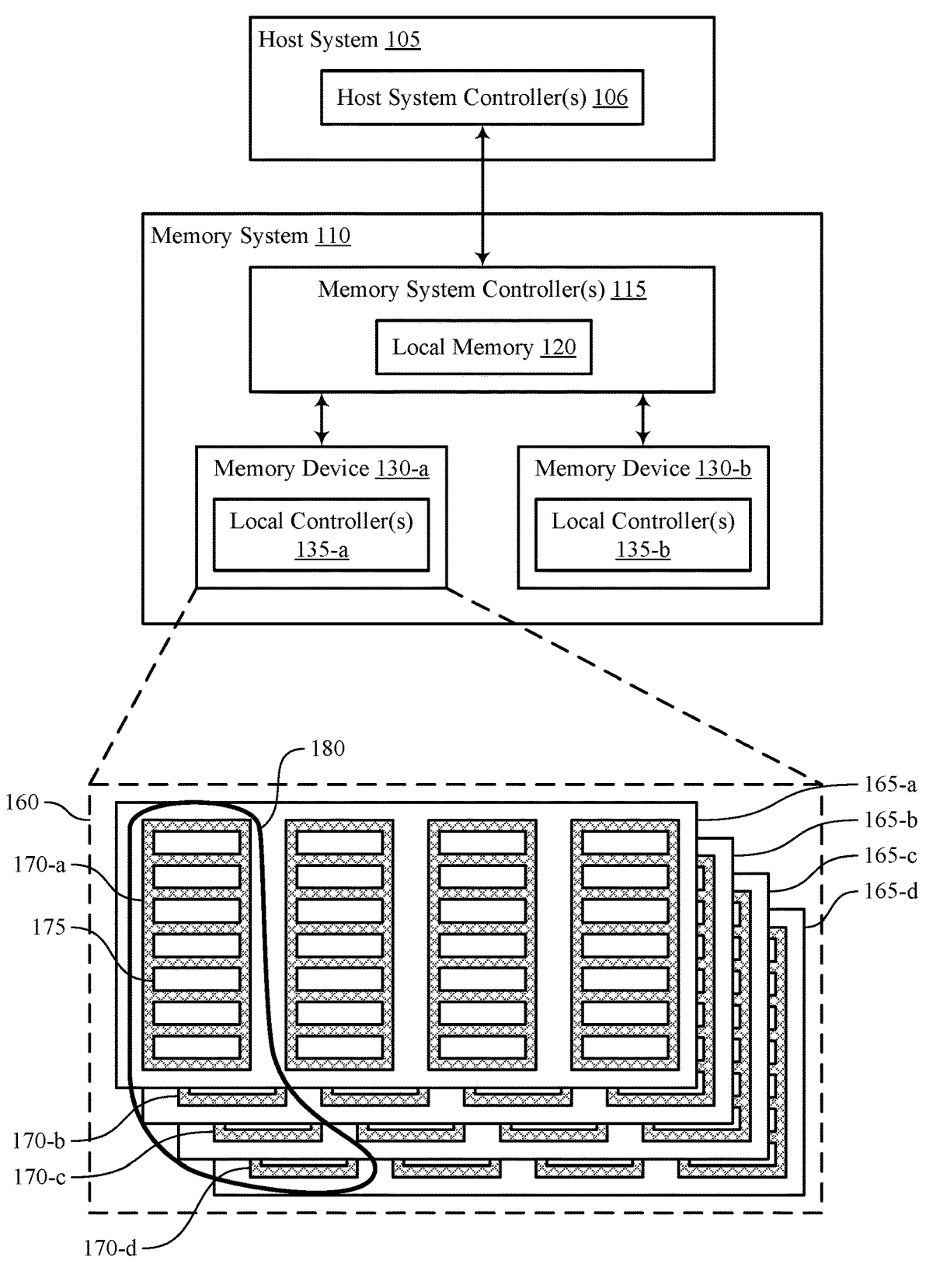
FIG. 1 illustrates an example of a system that supports data separation configurations for memory systems in accordance with examples as disclosed herein.

Memory systems may store data with different characteristics, such as data of different types, data associated with different validity characteristics (e.g., different validity durations), or data associated with different stream identifiers. For example, a memory system may store data associated with an operating system or an application, which may be valid (e.g., maintained) for a relatively long duration, and may store streaming data or other transient data, which may be valid for a relatively short duration (e.g., may be eligible for erasure after a relatively short duration). In some implementations, data may be associated with a 'temperature' indication, where data that is expected to be valid for relatively longer durations may be referred to as cold data, and data that is expected to be valid for relatively shorter durations may be referred to as hot data.

In some cases, a memory system may transfer data between blocks of memory cells (e.g., as part of a media management operation). For example, a memory system may transfer data as part of a folding operation (e.g., a flush operation, to transfer data from relatively a relatively low-density block of memory cells to a relatively high-density block of memory cells), as part of a garbage collection operation (e.g., to make a block of memory cells available for erasure), or as part of a wear-leveling operation (e.g., to support a more-uniform accumulation of wear across blocks of memory cells), among other transfer operations. However, some memory systems may not differentiate data or differentiate management of data based on respective data characteristics (e.g., data temperatures), which may result in various inefficiencies. For example, media management operations that do not account for data characteristics may result in resources being allocated for the transfer of relatively hot data, which may cause undue processing allocation, power allocation, or wear on memory cells due to the relatively temporary nature of relatively hot data that may be invalidated relatively quickly.

In accordance with examples as disclosed herein, a memory system may store one or more characteristics of data, which may be utilized to improve performance associated with transferring data from one block of memory cells to another. For example, to support a configuration of a given transfer operation (e.g., to transfer data from one or more source block to one or more target blocks), a memory system may be configured to evaluate whether or how to separate data according to characteristics of the data (e.g., during data transfer operations, based on one or more operating conditions of the memory system). Some transfer configurations may include transferring at least a portion of valid data regardless of (e.g., independent of) characteristics of the data, which may be associated with relatively faster data transfer or relatively earlier availability of storage space. For example, transferring data according to such configurations may include transferring hot data, warm data, and cold data from a source block to a same target block (e.g., concurrently). Some other transfer configurations may include transferring valid data based on data characteristics (e.g., validity characteristics, temperature characteristics) of the valid data, which may increase an amount of available space, reduce access latency (e.g., associated with reading co-located or consecutive data), or reduce write amplification (WA). For example, transferring data according to such configurations may include transferring at least a portion of cold data of a source block prior to transferring warm data of the source block and, in some examples, transferring the cold data and the warm data to different target blocks (e.g., each corresponding to a different validity characteristic, transferring concurrently, transferring sequentially with respect to data temperature). Some examples of such transfer configurations may include refraining from transferring relatively hot data, which may be invalidated before the memory system targets the corresponding block of memory cells for erasure (e.g., erasing invalidated hot data without transferring it to a different target block). Configuring transfer operations for data having different characteristics, including such techniques that may be further based on operating conditions of a memory system (e.g., a performance mode, a resource availability, a storage capacity or available storage space, media management conditions), may be implemented to support a memory system balancing performance characteristics, such as latency, power consumption, storage availability, WA, total bytes written (TBW), and other characteristics.

In addition to applicability in memory systems as described herein, techniques for improved data separation configurations for memory systems may be generally implemented to improve the performance of various electronic devices and systems (including artificial intelligence (AI) applications, augmented reality (AR) applications, virtual reality (VR) applications, and gaming). Some electronic device applications, including high-performance applications such as AI, AR, VR, and gaming, may be associated with relatively high processing requirements to satisfy user expectations. As such, increasing processing capabilities of the electronic devices by decreasing response times, improving power consumption, reducing complexity, increasing data throughput or access speeds, decreasing communication times, or increasing memory capacity or density, among other performance indicators, may improve user experience or appeal. Implementing the techniques described herein may improve the performance of electronic devices by facilitating improved data separation configurations for memory systems, which may decrease processing or latency times, improve response times, or otherwise improve user experience, among other benefits.

Features of the disclosure are initially described in the context of a system with reference to FIGS. 1. Features of the disclosure are described in the context of data transfer operations with reference to FIGS. 2 and 3. These and other features of the disclosure are further illustrated by and described in the context of an apparatus diagram and flow-charts that relate to data separation configurations for memory systems with reference to FIGS. 4 through 6.

FIG. 1 illustrates an example of a system 100 that supports data separation configurations for memory systems in accordance with examples as disclosed herein. The system 100 includes a host system 105 coupled with a memory system 110. The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other devices.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hardcoded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170 and, in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at a page level of granularity, or portion thereof) but may be erased at a second level of granularity (e.g., at a block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated, which may be due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has not been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The memory system 110 may perform various operations to transfer data between storage locations, such as between blocks of memory cells (e.g., between blocks 170, between virtual blocks 180). In some cases, the memory system 110 may initially store data received from the host system 105 in a first block (e.g., a source block, a lower-density block) and transfer the data to a second block (e.g., a target block, a higher-density block), such as when resources are available for media management operations. For example, the memory system 110 may store data received from the host system 105 in the first block and may wait until the memory system 110 is idle to transfer the data from the first block to a second block (e.g., as part of a background operation). In some cases, the memory system 110 may transfer data from a first block to a second block as part of a media management operation, such as a flush operation (e.g., a cache flush), a folding operation, a garbage collection operation, or a wear leveling operation, among others.

In some cases, the memory system 110 may transfer data between blocks without accounting for characteristics of the data, such as data temperature. In such cases, cold data may be stuck with hot data in a same block (e.g., a same block 170, a same virtual block 180) or hot data may be stuck with cold data in a same block, among other examples. In such cases, a block written with cold data and hot data may be targeted for garbage collection as a result of the transient nature of the hot data (e.g., due to an invalidation of hot data causing the block to satisfy a threshold amount or proportion of invalid data for garbage collection). Additionally, or alternatively, invalidation of hot data may create holes in cold data (e.g., cold data may not be stored in contiguous storage locations), which may degrade performance. For example, if data having a same temperature is stored in contiguous memory locations, the memory system 110 may increase a speed of access operations (e.g., read operations) using features like pre-read. In some cases, cold data may read relatively infrequently, but may be associated with bulk read operations (e.g., concurrently reading or caching a related set of data), which may be facilitated by the data of a bulk read operation being stored in relatively contiguous locations (e.g., storing data associated with a bulk read operation in a relatively small quantity of one or more blocks).

In accordance with examples as described herein, a memory system 110 may store one or more characteristics of data, which may be utilized to improve performance associated with transferring data from one block (e.g., a block 170, a virtual block 180) to another. For example, to support a configuration of a given transfer operation (e.g., to transfer data from one or more source blocks to one or more target blocks), the memory system 110 may be configured to evaluate whether or how to separate data based on characteristics of the data. Some transfer configurations may include transferring valid data regardless of characteristics of the data, which may be associated with relatively faster data transfer or relatively earlier availability of storage space. For example, transferring data according to such configurations may include transferring hot, warm, and cold data from a source block to a same target block (e.g., concurrently, as part of a same transfer operation). Some other transfer configurations may include transferring valid data based on data characteristics (e.g., validity characteristics, temperature characteristics), which may be associated with freeing a greater amount of available space, reduced access latency (e.g., associated with reading co-located or consecutive data), or reduced WA. For example, transferring data according to such transfer configurations may include transferring cold data of a source block prior to transferring warm data of the source block and, in some examples, transferring the cold data and the warm data to different target blocks (e.g., each corresponding to a different validity characteristic, concurrently in a same transfer operation, sequentially by data temperature). By configuring transfer operations for data having different characteristics and, in some examples, based on operating conditions of a memory system 110, the memory system 110 may balance performance characteristics, such as latency, power consumption, storage availability, WA, TBW, and others.

In some cases, because a programming time (e.g., TProg) for higher-density memory cells (e.g., QLCs) may be relatively high, based on input/output pattern, idle time availability, operating temperature for the memory system 110 (e.g., Xtemp), or any combination thereof, recovery of free blocks may be prioritized (e.g., without data separation) to meet quality of service (QoS) requirements. Based on urgency of garbage collection considering an amount of free blocks (e.g., blocks 170, virtual blocks 180), an amount of fragmentation in data stored at the memory system 110, an amount of expected incoming data, or any combination thereof, data may be folded from source blocks (e.g., SLCs, TLCs, QLCs) without data separation. The source blocks (e.g., one or more identifiers for the source blocks) may be recorded (e.g., stored) by firmware of the memory system 110 (e.g., by a memory system controller 115) and selected for garbage collection with data separation once the memory system 110 is out of an urgent garbage collection condition. For data transfer operations that occur during idle time, the memory system 110 may perform data separation to improve performance of the memory system 110 (e.g., to increase WA benefits).

In a high urgency case, such as if the memory system 110 is prioritizing processing speed, the memory system 110 may apply data separation to a subset of garbage collection source blocks. In a low urgency case, the memory system 110 may apply data separation to all source blocks. In some cases, the memory system 110 may track respective amounts of valid cold data, valid warm data, and valid hot data per block (e.g., per block 170, per virtual block 180, in local memory 120). For example, firmware of the memory system 110 may record an amount of valid data for each data characteristic (e.g., GrpNum(HOT,WARM,COLD)) separately per block 170 or per virtual block 180. In such cases, the memory system 110 may prioritize performing garbage collection for a source block with a highest amount of cold data (e.g., a highest value of GrpNum).

In some implementations, a memory system 110 may conserve resources by transferring data as part of one or more background operations without a dedicated cursor during write operations (e.g., in response to write commands from a host system 105). In some cases, the memory system 110 may not apply redundant array of independent node protection (e.g., redundant array of independent NAND (RAIN) protection) to the data as part of writing the data into one or more target blocks of a transfer operation. Such cases may occur because the memory system 110 may refrain from erasing (e.g., releasing, overwriting) data stored in the one or more source blocks until it confirms that the copy of the data is successfully stored in one or more target blocks. In some cases, the data transfer (e.g., data separation) techniques described herein may consume fewer resources than applying redundant array of independent node protection. In some cases, the memory system 110 may transfer data without simultaneously maintaining multiple open cursors (e.g., one cursor for each data characteristic). Additionally, or alternatively, data transfer operations as described herein may utilize a lesser quantity of storage space compared to other operations for media management.

The described techniques for transferring data may be performed using various characteristics to categorize data into different sets (e.g., by data type, by data characteristic). For example, groups of data may be associated with a validity characteristic, such as a validity duration characteristic, which may be associated with a duration for which data is anticipated to be valid at a memory system 110, or associated with a rate of invalidation of the data, among other characteristics of data validity. For example, a validity duration may be associated with an expected or average duration from a time that the data is written, generated, or stored (e.g., in one or more blocks 170, in one or more virtual blocks 180) to a time that the data becomes invalid (e.g., eligible for erasure). Such characteristics may be referred to as a data temperature, for which relatively colder data may be relatively static data (e.g., data that is relatively unlikely to change) that is associated with a relatively longer validity duration, and relatively warmer data may be relatively transient data (e.g., data that is relatively likely to change or data that is more likely to be used for a short duration) associated with a relatively shorter validity duration.

Although the described techniques may refer to hot data, warm data, and cold data, different data temperatures or different granularities (e.g., different quantities of two or more categories) may be implemented in accordance with the described techniques. For example, data may have any temperature of a range of temperatures, where each temperature corresponds to a validity duration or validity duration range for the data. Further, although the described techniques illustrate an example of using data temperature associated with a validity duration characteristic to distinguish groups of data, groups of data may be separated by other characteristics, which may be generally referred to as data characteristics or data types. For example, one data type may be associated with streaming or other relatively temporary data types (e.g., corresponding to relatively transient data), whereas another data type may be associated with operating system, archive, or other relatively persistent data types (e.g., corresponding to relatively static data).

In some cases, a memory system 110 may determine whether data characteristic identifiers (e.g., stream IDs) are supported or otherwise enabled by the memory system 110, or by the host system 105, or both. For example, a variable or a field in a table or a register (e.g., a mode register, a configuration register) may indicate whether data characteristic identifiers are enabled. In some cases, a data characteristic identifier may be indicated by a value from 0 to 3, where a value of 3 may indicate a validity duration that is longer than a value of 2, for example. In some cases, a host system 105 may provide one or more characteristic identifiers for data. For example, one or more characteristic identifiers may be transmitted to a memory system 110 as part of a write command. In such cases, the write command may include or be otherwise associated with one or more fields, such as one or more group number fields, that indicate data characteristics. In some examples, a memory system 110 may determine a data characteristic identifier, or update a data characteristic identifier, or both. For example, a memory system 110 may determine an initial value of a data characteristic identifier based on a type of data, or an application type, among other criteria. Additionally, or alternatively, a memory system 110 may update a data characteristic identifier (e.g., as indicated by a host system 105, as determined by the memory system 110), which may be based on a duration of validity of the data at the memory system 110. For example, data initially indicated or determined to be hot data may be updated to a warm data characteristic identifier or a cold data characteristic identifier based on a duration of the data being valid at the memory system 110 satisfying a threshold duration.

A memory system 110 (e.g., FW of the memory system 110, a memory system controller 115) may utilize data characteristic identifiers for writing data into different cursors (e.g., associated with different blocks 170, associated with different virtual blocks 180). For example, a memory system 110 may sort data (e.g., into different blocks 170, into different virtual blocks 180) using data characteristic identifiers. Additionally, or alternatively, a memory system 110 may separate data during garbage collection operations, folding operations, or wear leveling operations, or any combination thereof based on data characteristic identifiers.

A memory system 110 may store one or more data characteristic identifiers in one or more physical page addresses (PPAs) of an L2P table. For example, one or more bits may be reserved for indicating one or more data characteristic identifiers. Additionally, or alternatively, one or more trim bits of an L2P table may be utilized to indicate one or more data characteristic identifiers (e.g., if other bits are unavailable for reservation). In some cases, a memory system 110 may select a block for garbage collection based on one or more data characteristic identifiers as indicated by one or more bits stored in the L2P table associated with the block. In some cases, a memory system 110 may store range information that indicates a range of memory addresses (e.g., contiguous memory addresses) that store data (e.g., with a given characteristic). The range information may include an indication of an LBA for data, an indication of a count (e.g., a quantity of data or memory addresses storing the data), and an indication of one or more characteristics of the data. The memory system may store the range information using one or more bits (e.g., one or more spare bits) of an L2P table, using a dedicated table, or using one or more other components of the memory system 110, such as program erase controller application-specific integrated circuit (PCA).

In some cases, the memory system 110 may write data having two or more validity characteristics (e.g., two or more stream IDs) to a block of memory cells (e.g., a source block, a block 170, a virtual block 180) of the memory system 110. For example, a first portion of the data (e.g., one or more data units, one or more pages, one or more codewords) may have a first validity characteristic and a second portion of the data may have a second validity characteristic. The memory system 110 may determine, for a transfer operation, to transfer the data having the two or more validity characteristics (e.g., from the source block), whether to write the data (e.g., at least a portion of the data) to a same target block of memory cells (e.g., a block 170, a virtual block 180) or to write the data (e.g., at least a portion of the data) to multiple target blocks of memory cells each corresponding to a respective validity characteristic of the two or more validity characteristics. The memory system 110 may then perform the transfer operation based on the determination. For example, in some cases, the memory system 110 may write the first portion of the data and the second portion of the data to a single block. In some other cases, the memory system 110 may separate the first portion of the data and the second portion of the data by respective characteristics of the data. That is, the memory system 110 may write the first portion of the data to a first block corresponding to the first characteristic and the second portion of the data to a second block corresponding to the second characteristic.

Additionally, or alternatively, in some cases, the memory system 110 may write data associated with the two or more validity characteristics to a block and determine, for a transfer operation, whether to transfer all of the data associated with the two or more validity characteristics or to transfer a portion of the data (e.g., a subset of less than all of the data) associated with fewer than all of the two or more validity characteristics. The memory system may perform the transfer operation based on the determination. In some cases, the memory system 110 may invalidate the portion of the data in the block based on determining to transfer the portion of the data (e.g., after transferring the portion of the data to a second block of the memory system 110). The memory system 110 may maintain the validity of a second portion of the data, associated with at least one validity characteristic of the two or more validity characteristics, in the block.

In some examples, a memory system 110 may determine a transfer configuration associated with data having different characteristics (e.g., whether to transfer data to one or multiple target blocks, whether to transfer all of the data or a portion of the data) based on one or more operating conditions of the memory system 110. For example, the one or more operating conditions of the memory system 110 may include an amount of available space of a set of one or more blocks of memory cells that includes the block of memory cells. In some cases, the one or more operating conditions may include an input/output pattern for the memory system 110, or a mode of the memory system (e.g., whether the memory system 110 is in an idle mode or a high-performance mode). An input/output pattern may include a pattern or a sequence of access operations, of other operations for receiving and processing information by the memory system 110.

In some cases, a memory system 110 may determine a transfer configuration associated with data having different characteristics based on a resource availability of the memory system 110 (e.g., an availability of processing resources, an availability of power resources, an availability of storage resources). In some cases, a memory system 110 may determine a transfer configuration associated with data having different characteristics based on a temperature of the memory system 110 (e.g., an operating temperature, a current temperature, a cross temperature, such as a difference between a write temperature and a read temperature or current temperature). In some cases, a memory system 110 may determine a transfer configuration associated with data having different characteristics based on a storage density of the block of memory cells (e.g., whether the source block includes SLCs, MLCs, TLCs, or any combination thereof), or on a target block storage density, or a combination thereof.

In some examples, the memory system 110 may select a source block for a transfer operation based on an amount of the data has a specific validity characteristic (e.g., of a set of multiple validity characteristics). The memory system 110 may determine the amount of the data that is associated with the validity characteristic based on reading a data quantity indicator for the validity characteristic that corresponds to the block of memory cells. For example, the memory system 110 may read the data quantity indicator from an L2P table. Additionally, or alternatively, the memory system 110 may select a source block for a transfer operation based on a duration that the data has been stored in the block, such as selecting a block having data stored for a relatively long duration. Additionally, or alternatively, the memory system 110 may select a source block for a transfer operation based on a quantity of erase cycles associated with the block. In some cases, the memory system 110 may update a validity characteristic for at least a portion of the data based on a duration of validity of the portion of the at least the portion of the data at the memory system 110 (e.g., assigning a portion of the data with a relatively colder temperature if validity is maintained for a threshold duration). The memory system 110 may determine a target block storage density (e.g., select a target block based on a storage density of the target block) for the transfer operation based on one or more operating conditions of the memory system 110 (e.g., whether to transfer data to a relatively lower-density target block for relatively faster transfer, or to a relatively higher-density target block for relatively greater available storage space).

The system 100 may include any quantity of non-transitory computer readable media that support data separation configurations for memory systems. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

Figure 2:
FIG. 2 illustrates an example of a data transfer operation that supports data separation configurations for memory systems in accordance with examples as disclosed herein.
Figure 2:
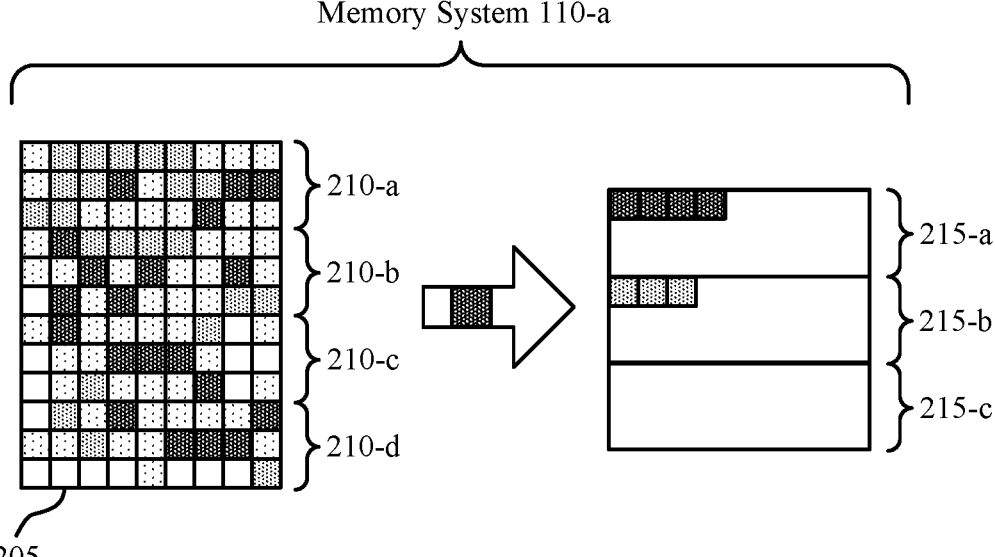

FIG. 2 illustrates an example of a data transfer operation 200 that supports data separation configurations for memory systems in accordance with examples as disclosed herein. The data transfer operation 200 may be performed by a memory system 110-a, and illustrates an example of a transfer configuration that includes transferring data based on one or more characteristics of the data. For example, the data transfer operation 200 may include transferring cold data 220 prior to transferring warm data 225 or transferring hot data 230, or refraining from transferring warm data 225 and hot data 230, among other examples. The memory system 110-a may include blocks (e.g., blocks 170, virtual blocks 180) of one or more memory devices 130 which, in the context of the data transfer operation 200, may be described with reference to blocks 210 (e.g., source blocks, cache blocks, buffer blocks) and blocks 215 (e.g., target blocks).

Hot data 230 may refer to data that is frequently invalidated, erased, or overwritten. Examples of hot data 230 may include data used by real-time analytics, streaming data, sensor data, or other types of data. In some cases, to improve performance of the memory system 110-a, hot data 230 may be stored in memory locations (e.g., memory blocks) that are quickly accessible by a host system, such as a buffer (e.g., one or more blocks 210). Cold data 220 may refer to data that is infrequently invalidated, erased, or overwritten as compared to hot data 230. That is, hot data 230 may become invalid more quickly than cold data 220. Examples of cold data 220 may include data that is archived (e.g., for compliance reasons), historical data, backup data, inactive data, data for an operating system, or other data types. In some cases, to improve performance, cold data 220 may be stored at memory locations with relatively high density and slow access, which may conserve storage resources. Warm data 225 may refer to data this invalidated, erased, or overwritten more frequently than cold data 220 but less frequently than hot data 230. In some cases, hot data 230 may be invalidated in seconds while cold data 220 or warm data 225 may remain valid for minutes, hours, or longer.

Blocks 210 and blocks 215 may each include a plurality of data units 205. A data unit 205 may be an example of a subdivision of data such as a page, a codeword, a logical block, or any other subdivision of data. In some examples, a logical block may be referred to as a virtual page or a physical translation unit (PTU). In some examples, a logical block (e.g., plus metadata, error correction code (ECC) bits, or both, where applicable) may form a codeword. The data transfer operation 200 may illustrate respective characteristics (e.g., validity duration characteristics, data temperatures, stream IDs) for each data unit 205 (e.g., whether each data unit 205 stores hot data 230, warm data 225, cold data 220, or no data 235). For example, some of the data units 205 may store hot data 230, some of the data units 205 may store warm data 225, some of the data units 205 may store cold data 220, and some of the data units 205 may store no data 235 (e.g., may be empty, may be written with invalid data) as shown by the shading of the data units 205.

Respective characteristics for data units 205 may be identified by one or more indicators (e.g., a stream ID), which may be determined at or communicated by a host system 105, the memory system 110-*a*, or both. In some examples, the host system 105 may determine the characteristic of the data being stored and may transmit an indication of the characteristic of the data to the memory system 110-*a*. In some examples, an indication of a data characteristic may be implicitly signaled by the host system 105. In such examples, the host system 105 may provide information about the data to be written to the memory system 110-*a* and the memory system 110-*a* may use that information to determine the characteristic of the data. The indication may be transmitted as part of a write command, as part of the data associated with the write command, as a separate command, as separate metadata, or a combination thereof. In some examples, the memory system 110-*a* determine the type of the data being stored using any of the techniques described herein. In some examples, an indication of a data characteristic may be an example of a stream ID or may be an example of one or more bits of a stream ID associated with the data or the write command.

In some cases, the memory system 110-*a* may store an L2P table. For example, one or more blocks 210, or a local memory 120, may include a set of memory cells that store a respective L2P table for the one or more blocks 210. Additionally, or alternatively, one or more blocks 215 may include a set of memory cells that store a respective L2P table for the one or more blocks 215. An L2P table may include a set of rows and a set of columns. Each row of an L2P table may be associated with a logical address (e.g., a logical block address (LBA), of a block 210, of a block 215) implicitly, or may include a logical address indicator that indicates a logical address, and each row may include a physical address indicator (e.g., for a physical block address (PBA)) that corresponds to the logical address. The L2P table may be an example of a data structure that is used to map LBAs to PBAs, where an LBA may be an example of an address that is used by a host system to access data stored in the memory system 110-*a*, and a PBA may be an example of a physical location of the data within the memory system 110-*a* (e.g., a location of one or more memory cells, an indication of an address in a block 170 or other block unit). An L2P table may be utilized to translate LBAs used by the host system into corresponding PBAs, which may allow the memory system 110-*a* to retrieve data from a location of the memory system 110-*a*.

An L2P table also may be used (e.g., by the memory system 110-*a*) to facilitate data transfer between one or more blocks 210 and one or more blocks 215. For example, each row of an L2P table may include an indication of a data characteristic, such as a stream ID (e.g., for each PTU, for each data unit 205). In some cases, the stream ID may be stored in one or more reserved bits or one or more trim bits of an L2P table. In some cases, data may be transferred based on one or more characteristics of the data, which may be indicated by a stream ID in an L2P table. For example, the memory system 110-*a* may read one or more L2P tables to select data units 205 having a specific data characteristic for a transfer operation, where such a selection may be performed without reading individual data units 205.

Techniques are described for transferring data from one or more blocks 210 to one or more blocks 215 based on characteristics of the data stored in the one or more blocks 210, which may support a balanced allocation of resources of the memory system 110-*a*. For example, data separation during a host system write operation (e.g., an initial writing of data from a host system) may be relatively resource intensive and the techniques described herein may enable the memory system 110-*a* to refrain from performing data separation during host system write operations. Such techniques may be applied (e.g., by the memory system 110-*a*) for transferring data between blocks of any storage density configurations. In some examples of the described techniques, the blocks 210 may be configured with a relatively lower storage density (e.g., associated with SLCs, MLCs, or TLCs) and the blocks 215 may be configured with a relatively higher storage density (e.g., associated with MLCs, TLCs, or QLCs), in which case the illustrated transfers may be applicable to a folding operation (e.g., a flush operation, a cache flush, a buffer flush). In some other examples of the described techniques, the blocks 210 and the blocks 215 may be configured with the same storage density, in which case the illustrated transfers may be applicable to a garbage collection operation, or a wear leveling operation, among other media management operations. However, the described techniques may be implemented with other storage density configurations and operation nomenclature.

The memory system 110-*a* may perform various evaluations that support performing a transfer of the data stored in one or more blocks 210 to one or more blocks 215. For example, the memory system 110-*a* may determine whether an amount of space available at the memory system 110-*a* satisfies a threshold, which may include the memory system 110-*a* determining a quantity of available blocks 210, or data units 205 (e.g., pages, codewords) thereof, or some other measure of available space (e.g., space available in a cache of relatively lower-density memory cells, space available in a write booster cache, space available for longer-term storage). If the amount of available space is relatively low (e.g., is less than or equal to a threshold), the memory system 110-*a* may proceed with transferring valid data out of one or more blocks 210, which may support blocks 210 being made available for erasure, or to be otherwise made available to store new data.

Additionally, or alternatively, the memory system 110-*a* may trigger a transfer of data from one or more blocks 210 to one or more blocks 215 (e.g., initiate the data transfer operation 200) in response to an operating state or condition of the memory system 110-*a* (e.g., an explicit host request to free up a write booster buffer, operation or configuration in an idle state, a hibernate state, or another low-power state, a quantity of commands received from a host system within a duration being below a threshold).

In some examples, the memory system 110-*a* may select blocks 210 based on an amount of data in respective blocks 210. For example, a memory system 110-*a* may prioritize transferring data out of blocks 210 having relatively lower amounts of valid data, which may support faster transfer operations that make storage space available more quickly (e.g., based on a greedy policy). Additionally, or alternatively, in some examples, a memory system 110-*a* may determine to transfer data from one or more blocks 210 to one or more blocks 215 based on a temperature of the data, such as in accordance with a grouping of hot data 230, warm data 225, and cold data 220.

In some examples, the memory system 110-*a* may determine to separate data (e.g., for transfer) based on characteristics of the data. In some cases, the memory system 110-*a* may determine to transfer data based on characteristics of the data (e.g., according to the second configuration) in response to one or more operating conditions of the memory system, such as a temperature of the memory system 110-a, a resource availability of the memory system 110-a, an amount of available space at the memory system 110-a (e.g., in one or more blocks 210), an input/output pattern for the memory system 110-a, or any combination thereof.

In some examples, data having different characteristics may be transferred sequentially (e.g., in a sequence according to data temperature). For example, data having a first characteristic may be transferred from one or more blocks 210 to one or more blocks 215 before data having a second characteristic. In such cases, the memory system 110-a may transfer cold data 220 prior to warm data 225 and warm data 225 prior to hot data 230. In some other examples, data having different characteristics may be transferred concurrently (e.g., transferring all of the data in each block 210, which may be supported by reading data units 205 of the blocks 210 sequentially).

Additionally, or alternatively, the memory system 110-a may transfer data having different characteristics to respective blocks 215, such as transferring cold data 220 to the block 215-a, warm data to the block 215-b, and hot data to the block 215-c. In some such examples, the memory system 110-a may not sequence (e.g., order) data transfer by data characteristics. Prioritizing the transfer of data from one or more blocks 210 to one or more blocks 215 based on one or more characteristics of the data may reduce WA or increase a TBW metric associated with the memory system 110-a. For example, cold data 220 may be transferred before warm data 225 or hot data 230. In such examples, hot data 230 may be invalidated or altered before transferring to one or more blocks 215 thus reducing an amount of data transferred.

The memory system 110-a may transfer data according to various conditions and prioritization schemes. For example, the memory system 110-a may prioritize transferring data out of a block 210 with a highest quantity of cold data 220 compared to other blocks 210. In such cases, the memory system 110-a may determine a quantity of cold data 220 in each block 210 (e.g., by reading one or more entries of an L2P table, by reading an indicator of how much data of a given temperature is stored in a block 210) and prioritize transferring data out of a block 210 with the highest quantity of cold data 220. In some other cases, the memory system may prioritize transferring data out of a block 210 with an oldest time stamp compared to other blocks 210 (e.g., indicating relatively colder data). For example, each block 210 may be associated with a time stamp that indicates a time that the block was last written. Accordingly, the memory system 110-a may prioritize one or more blocks 210 that have relatively cold time stamps and have not been recently written. In some other cases, the memory system 110-a may prioritize transferring data out of a block 210 with a lowest erase count compared to other blocks 210. For example, the memory system 110-a may determine a quantity of erase operations performed at each block 210 and may select a block 210 for data transfer based on the block 210 being associated with a higher quantity of erase operations than other blocks 210. The erase count of a source block 210 may be considered while selecting one or more source blocks for garbage collection, which may avoid a block 210 storing cold data 220 from being under-utilized in terms of erase count. The difference between erase count of cold and warm blocks and an average erase count across all virtual blocks may be considered to recycle the cold and warm bocks.

In an example implementation, the memory system 110-a may select a quantity of source blocks 210 for garbage collection based on valid data, which may include the memory system 110-a using data characteristics for each of a set of source blocks 210. For example, the memory system 110-a may execute the garbage collection operation three times in examples having three data characteristics. A first iteration of the garbage collection operation may include collecting cold data 220 from each of a set of blocks 210, a second iteration of the garbage collection operation may include collecting warm data 225 from each of the set of blocks 210, and a third iteration of the garbage collection operation may include collecting hot data 230 from each of the set of blocks 210. Such techniques for performing garbage collection may provide improved data separation (e.g., by data characteristics), and may be prioritized when resources of the memory system 110 are available.

Figure 3:
FIG. 3 illustrates an example of a data transfer operation that supports data separation configurations for memory systems in accordance with examples as disclosed herein.
Figure 3:
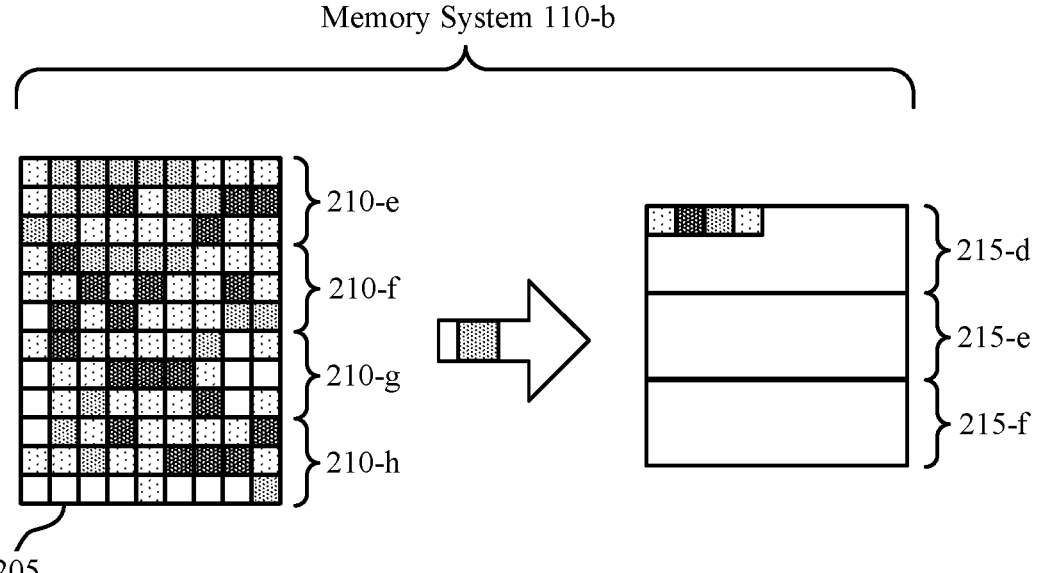

FIG. 3 illustrates an example of a data transfer operation 300 that supports data separation configurations for memory systems in accordance with examples as disclosed herein. The data transfer operation 300 may be performed by a memory system 110-b, and illustrates an example of a transfer configuration that includes transferring data regardless of data characteristics. For example, the data transfer operation 300 may include transferring data with different characteristics (e.g., cold data 220, warm data 225, hot data 230) concurrently or sequentially to a same block 215, among other examples.

Techniques are described for transferring data from one or more blocks 210 to one or more blocks 215 regardless of one or more characteristics (e.g., regardless of stream ID, regardless of data temperature) for the data stored in the one or more blocks 210. In some cases, the memory system 110-b may determine to transfer data without consideration of characteristics of the data in response to one or more operating conditions of the memory system, such as a temperature of the memory system 110-b, a resource availability of the memory system 110-b, a quantity of available space at the memory system 110-b (e.g., in one or more blocks 210), an input/output pattern for the memory system 110-b, or any combination thereof. The techniques described herein may be applied (e.g., by the memory system 110-b) for transferring data between blocks of any storage density configurations. For example, the blocks 210 may be configured with a relatively lower storage density and the blocks 215 may be configured with a relatively higher storage density. In some other examples of the described techniques, the blocks 210 and the blocks 215 may be configured with the same storage density.

The memory system 110-b may perform various evaluations that support performing a transfer of the data stored in one or more blocks 210 to one or more blocks 215. For example, the memory system 110-b may determine whether an amount of space available at the memory system 110-b satisfies a threshold, which may include the memory system 110-b determining a quantity of available blocks 210, or data units 205 (e.g., pages, codewords) thereof, or some other measure of available space (e.g., space available in a cache of relatively lower-density memory cells, space available in a write booster cache). If the amount of available space satisfies the threshold, the memory system 110-b may proceed with transferring valid data out of one or more blocks 210, which may support blocks 210 being made available for erasure, or to be otherwise made available to store new data. Additionally, or alternatively, the memory system 110-b may trigger a transfer of data from one or more blocks 210 to one or more blocks 215 in response to an operating state or condition of the memory system 110-b (e.g., an explicit host request to free up the write booster buffer, operation or configuration in an idle state, a hibernate state, or another low-power state, a quantity of commands received from a host system within a duration being below a threshold).

In some examples, the memory system 110-*b* may select blocks 210 based on an amount of data in respective blocks 210. For example, a memory system 110-*b* may prioritize blocks having relatively lower amounts of valid data, which may support faster transfer operations that make storage space available more quickly (e.g., based on a greedy policy). In some cases, the memory system 110-*b* may store one or more characteristics of data in an L2P table. In some other cases, however, the memory system 110-*b* may not store the one or more characteristics of data in the L2P table, which may conserve processing resources at the memory system 110-*b*.

In some cases, the memory system 110-*b* may transfer data (e.g., data having different characteristics) sequentially or concurrently. For example, the memory system 110-*b* may concurrently transfer a set of data units 205 (e.g., including any combination of cold data 220, warm data 225, and hot data 230) from the block 210-*a* to the block 215-*a*. Additionally, or alternatively, the memory system 110-*b* may sequentially transfer individual data units 205 of the set of data units 205. Although FIG. 3 illustrates one example or one portion of an example where data is transferred to a block 215-*d* (e.g., to a single block 215), the memory system 110-*b* may transfer data to multiple blocks 215 (e.g., sequentially or concurrently).

Transferring data from one or more blocks 210 to one or more blocks 215 regardless of one or more data characteristics (e.g., mixing data with different characteristics) may conserve resources at the memory system 110-*b*. For example, the memory system 110-*b* may refrain from performing some operations associated with characteristic-based data separation, such as determining data characteristics, reading data characteristics (e.g., from an L2P table), determining specific blocks 215 for data transfer based on data characteristics, or any combination thereof. In some cases, the memory system 110-*b* may determine to transfer data regardless of characteristics of the data based on one or more operating conditions for the memory system 110-*b*. For example, the memory system 110-*b* may determine that a temperature of the memory system 110-*b* exceeds a threshold temperature and may refrain from expending resources for transferring data based on characteristics, which may reduce the temperature of the memory system 110-*b*.

In some cases, the memory system 110-*b* may determine configurations for data transfer on a per-block basis, which may enable the memory system 110-*b* to further improve data transfer operations by selecting different data transfer configurations for various subsets of blocks 210. For example, the memory system 110-*b* may transfer data out of the block 210-*e*, the block 210-*f*, and the block 210-*g* according to a first configuration (e.g., without consideration of data characteristics), and the memory system 110-*b* may transfer data out of the block 210-*h* according to a second configuration (e.g., based on data characteristics). In accordance with examples as described herein, the memory system may select any data transfer configuration for data transfer between any of blocks 210 and blocks 215. Determining configurations for data transfer on a per-block basis may improve efficiency of media management operations, such as garbage collection. For example, the memory system 110-*b* may refrain from performing various processing operations associated with separating data based on characteristics of at least a portion of blocks 210.

In some cases, the memory system 110-*b* may determine whether to use various configurations for data transfer during data transfer operations. For example, the memory system 110-*b* may initiate a data transfer operation based on determining a quantity of data with a given characteristic (e.g., cold data 220) satisfies a threshold quantity (e.g., is sufficient to fill a block 215-*d*). The memory system 110-*b* may initiate the data transfer operation and transfer a portion of the data to a block 215. During the data transfer operation the memory system 110-*b* may determine that a portion of the data (e.g., a portion of the data that has not been transferred) has become invalidated. The memory system 110-*b* may determine to refrain from transferring the invalidated data. In some cases, to fill the block 215, the memory system 110-*b* may determine to transfer data with other characteristics (e.g., warm data 225, hot data 230) to the block 215, which may result in faster completion of the transfer operation and release of a block 210 that the data was transferred from.

In an example implementation, the memory system 110-*a* may select a quantity of source blocks 210 for garbage collection (e.g., N source blocks) based on valid data (e.g., based on a quantity of valid data in respective source blocks). For a first portion of the quantity of source blocks 210 (e.g., N–1 source blocks), the memory system 110-*a* may not use data characteristics and may transfer (e.g., copy) cold data 220, warm data 225, and hot data 230. For a second portion of the quantity of source blocks 210 (e.g., for 1 source block), the memory system 110-*a* may use data characteristics. The memory system 110-*a* may execute the garbage collection operation three times. A first iteration of the garbage collection operation may include collecting (e.g., transferring) cold data 220 from all source blocks 210, a second iteration of the garbage collection operation may include collecting warm data 225 from all source blocks 210, and a third iteration of the garbage collection operation may include collecting hot data 230 from all source blocks 210. Such techniques for performing garbage collection operations may enable the memory system 110-*a* to release a quantity of source blocks (e.g., N–1 source blocks) while valid data is merged, which may improve resource consumption for garbage collection operations. Additionally, or alternatively, such techniques may reduce an impact on garbage collection policy.

Figure 4:
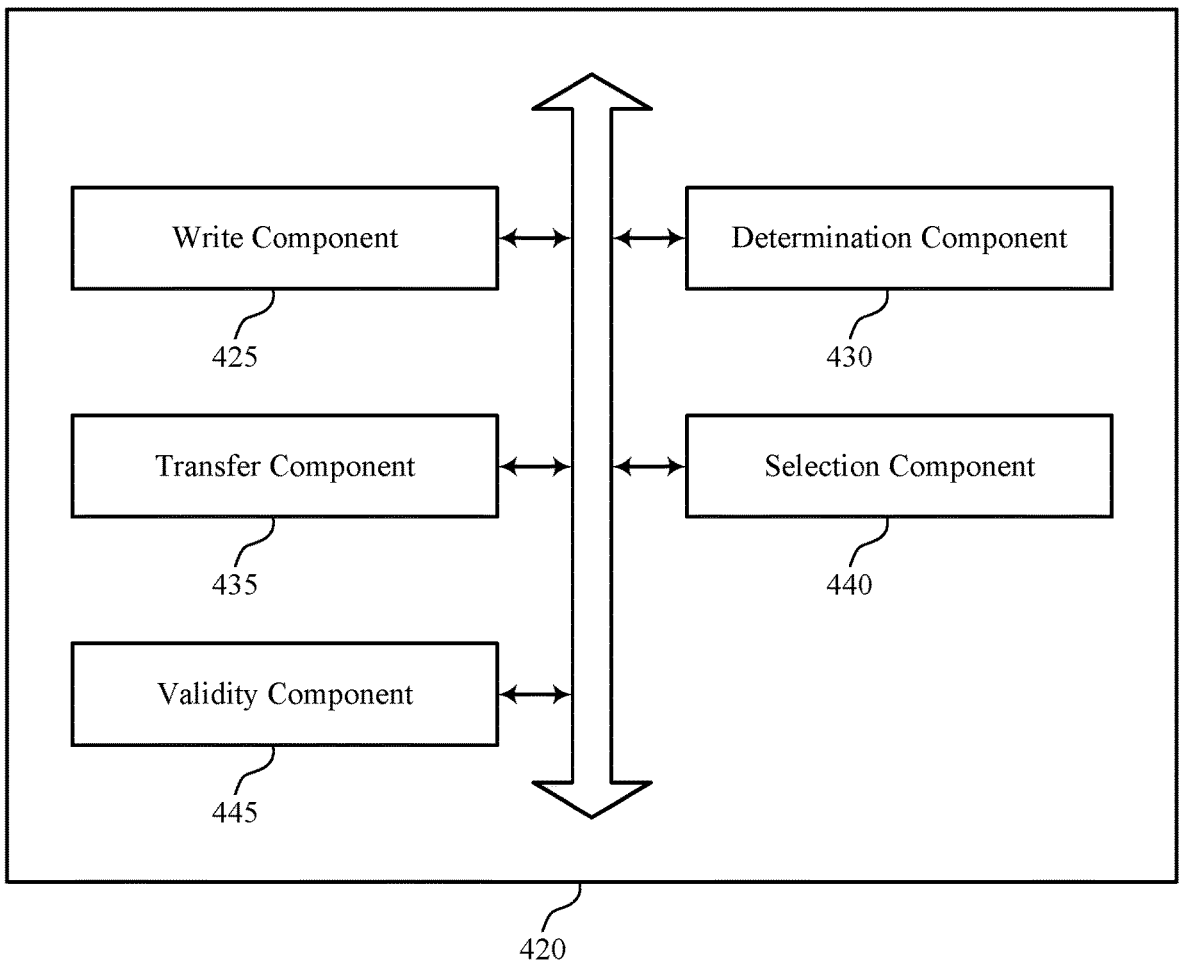
FIG. 4 illustrates a block diagram of a memory system that supports data separation configurations for memory systems in accordance with examples as disclosed herein.

FIG. 4 illustrates a block diagram 400 of a memory system 420 that supports data separation configurations for memory systems in accordance with examples as disclosed herein. The memory system 420 may be an example of aspects of a memory system as described with reference to FIGS. 1 through 3. The memory system 420, or various components thereof, may be an example of means for performing various aspects of data separation configurations for memory systems as described herein. For example, the memory system 420 may include a write component 425, a determination component 430, a transfer component 435, a selection component 440, a validity component 445, or any combination thereof. Each of these components may communicate, directly or indirectly, with one another (e.g., via one or more buses).

In some examples, the write component 425 may be configured as or otherwise support a means for writing data associated with two or more validity characteristics to a block of memory cells of the memory system 420; the determination component 430 may be configured as or otherwise support a means for determining, for a transfer operation to transfer the data associated with the two or more validity characteristics from the block of memory cells, whether to write the data associated with the two or more validity characteristics to a same target block of memory cells or to write the data associated with the two or more validity characteristics to multiple target blocks of memory cells each corresponding to a respective validity characteristic of the two or more validity characteristics; and the transfer component 435 may be configured as or otherwise support a means for performing the transfer operation based at least in part on the determination.

In some examples, to support performing the transfer operation, the transfer component 435 may be configured as or otherwise support a means for writing, based at least in part on determining to write the data associated with the two or more validity characteristics to the multiple target blocks of memory cells, a first portion of the data associated with a first validity characteristic of the two or more validity characteristics to a first target block that corresponds to the first validity characteristic, and a second portion of the data associated with a second validity characteristic of the two or more validity characteristics to a second target block that corresponds to the second validity characteristic.

In some examples, the determination component 430 may determine whether to write the data associated with the two or more validity characteristics to a same target block of memory cells or to write the data associated with the two or more validity characteristics to the multiple target blocks of memory cells based at least in part on one or more operating conditions of the memory system 420.

In some examples, the determination component 430 may determine whether to write the data associated with the two or more validity characteristics to a same target block of memory cells or to write the data associated with the two or more validity characteristics to the multiple target blocks of memory cells based at least in part on an amount of available space of a set of one or more blocks of memory cells of the memory system 420 that includes the block of memory cells.

In some examples, the determination component 430 may determine whether to write the data associated with the two or more validity characteristics to a same target block of memory cells or to write the data associated with the two or more validity characteristics to the multiple target blocks of memory cells based at least in part on an input/output pattern for the memory system 420.

In some examples, the determination component 430 may determine whether to write the data associated with the two or more validity characteristics to a same target block of memory cells or to write the data associated with the two or more validity characteristics to the multiple target blocks of memory cells based at least in part on a resource availability of the memory system 420.

In some examples, the determination component 430 may determine whether to write the data associated with the two or more validity characteristics to a same target block of memory cells or to write the data associated with the two or more validity characteristics to the multiple target blocks of memory cells based at least in part on a temperature of the memory system 420.

In some examples, the determination component 430 may determine whether to write the data associated with the two or more validity characteristics to a same target block of memory cells or to write the data associated with the two or more validity characteristics to the multiple target blocks of memory cells based at least in part on a storage density of the block of memory cells, or on a target block storage density, or a combination thereof.

Additionally, or alternatively, the write component 425 may be configured as or otherwise support a means for writing data associated with two or more validity characteristics to a block of memory cells of the memory system 420; the determination component 430 may be configured as or otherwise support a means for determining, for a transfer operation, whether to transfer the data associated with the two or more validity characteristics or to transfer a portion of the data associated with fewer than all of the two or more validity characteristics; and the transfer manager 450 may be configured as or otherwise support a means for performing the transfer operation based at least in part on the determination.

In some examples, to support performing the transfer operation, the transfer manager 450 may be configured as or otherwise support a means for invalidating the portion of the data in the block of memory cells, based at least in part on determining to transfer the portion of the data, after transferring the portion of the data to a second block of memory cells of the memory system 420. In some examples, to support performing the transfer operation, the transfer manager 450 may be configured as or otherwise support a means for maintaining the validity of a second portion of the data, associated with at least one validity characteristic of the two or more validity characteristics, in the block of memory cells.

In some examples, to support performing the transfer operation, the transfer manager 450 may be configured as or otherwise support a means for writing at least a portion of the data to a target block of the memory system 420 that corresponds to a validity characteristic of the two or more validity characteristics that corresponds to the at least a portion of the data.

In some examples, the determination component 430 may determine whether to transfer the data associated with the two or more validity characteristics or to transfer the portion of the data associated with fewer than all of the two or more validity characteristics based at least in part on one or more operating conditions of the memory system 420.

In some examples, the determination component 430 may determine whether to transfer the data associated with the two or more validity characteristics or to transfer the portion of the data associated with fewer than all of the two or more validity characteristics based at least in part on an amount of available space of a set of one or more blocks of memory cells of the memory system 420 that includes the block of memory cells.

In some examples, the determination component 430 may determine whether to transfer the data associated with the two or more validity characteristics or to transfer the portion of the data associated with fewer than all of the two or more validity characteristics based at least in part on an input/output pattern for the memory system 420.

In some examples, the determination component 430 may determine whether to transfer the data associated with the two or more validity characteristics or to transfer the portion of the data associated with fewer than all of the two or more validity characteristics based at least in part on a resource availability of the memory system 420.

In some examples, the determination component 430 may determine whether to transfer the data associated with the two or more validity characteristics or to transfer the portion of the data associated with fewer than all of the two or more validity characteristics based at least in part on a temperature of the memory system 420.

In some examples, the determination component 430 may determine whether to transfer the data associated with the two or more validity characteristics or to transfer the portion of the data associated with fewer than all of the two or more validity characteristics based at least in part on a storage density of the block of memory cells, or on a target block storage density, or a combination thereof.

In some examples, the determination component 430 may be configured as or otherwise support a means for determining a target block storage density for the transfer operation based at least in part on one or more operating conditions of the memory system 420.

In some examples, the selection component 440 may be configured as or otherwise support a means for selecting the block of memory cells for the transfer operation based at least in part on an amount of the data that is associated with a validity characteristic of the two or more validity characteristics. In some examples, the determination component 430 may be configured as or otherwise support a means for determining the amount of the data that is associated with the validity characteristic based at least in part on reading a data quantity indicator for the validity characteristic that corresponds to the block of memory cells.

In some examples, the selection component 440 may be configured as or otherwise support a means for selecting the block of memory cells for the transfer operation based at least in part on a duration that the data, or a portion thereof, has been stored in the block of memory cells.

In some examples, the selection component 440 may be configured as or otherwise support a means for selecting the block of memory cells for the transfer operation based at least in part on a quantity of erase cycles associated with the block of memory cells.

In some examples, the write component 425 may be configured as or otherwise support a means for writing indications of the two or more validity characteristics associated with respective portions of the data to a logical-to-physical address mapping table associated with the block of memory cells In some examples, the validity component 445 may be configured as or otherwise support a means for updating a validity characteristic associated with at least the portion of the data based at least in part on a duration of validity of the at least the portion of the data.

In some examples, each validity characteristic of the two or more validity characteristics is associated with a respective data validity duration. In some examples, each validity characteristic of the two or more validity characteristics is associated with a respective data type. In some examples, each validity characteristic of the two or more validity characteristics is associated with a respective stream identifier.

FIG. 5 illustrates a flowchart showing a method 500 that supports data separation configurations for memory systems in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 505, the method may include writing data associated with two or more validity characteristics to a block of memory cells of a memory system. In some examples, aspects of the operations of 505 may be performed by a write component 425 as described with reference to FIG. 4.

At 510, the method may include determining, for a transfer operation to transfer the data associated with the two or more validity characteristics from the block of memory cells, whether to write the data associated with the two or more validity characteristics to a same target block of memory cells or to write the data associated with the two or more validity characteristics to multiple target blocks of memory cells each corresponding to a respective validity characteristic of the two or more validity characteristics. In some examples, aspects of the operations of 510 may be performed by a determination component 430 as described with reference to FIG. 4.

At 515, the method may include performing the transfer operation based at least in part on the determination. In some examples, aspects of the operations of 515 may be performed by a transfer component 435 as described with reference to FIG. 4.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for writing data associated with two or more validity characteristics to a block of memory cells of a memory system; determining, for a transfer operation to transfer the data associated with the two or more validity characteristics from the block of memory cells, whether to write the data associated with the two or more validity characteristics to a same target block of memory cells or to write the data associated with the two or more validity characteristics to multiple target blocks of memory cells each corresponding to a respective validity characteristic of the two or more validity characteristics; and performing the transfer operation based at least in part on the determination.

Aspect 2: The method, apparatus, or non-transitory computer-readable medium of aspect 1, where performing the transfer operation includes operations, features, circuitry, logic, means, or instructions, or any combination thereof for writing, based at least in part on determining to write the data associated with the two or more validity characteristics to the multiple target blocks of memory cells, a first portion of the data associated with a first validity characteristic of the two or more validity characteristics to a first target block that corresponds to the first validity characteristic, and a second portion of the data associated with a second validity characteristic of the two or more validity characteristics to a second target block that corresponds to the second validity characteristic.

Aspect 3: The method, apparatus, or non-transitory computer-readable medium of any of aspects 1 through 2, where determining whether to write the data associated with the two or more validity characteristics to a same target block of memory cells or to write the data associated with the two or more validity characteristics to the multiple target blocks of memory cells is based at least in part on one or more operating conditions of the memory system.

Aspect 4: The method, apparatus, or non-transitory computer-readable medium of aspect 3, where determining whether to write the data associated with the two or more validity characteristics to a same target block of memory cells or to write the data associated with the two or more validity characteristics to the multiple target blocks of memory cells is based at least in part on an amount of available space of a set of one or more blocks of memory cells that includes the block of memory cells.

Aspect 5: The method, apparatus, or non-transitory computer-readable medium of any of aspects 3 through 4, where determining whether to write the data associated with the two or more validity characteristics to a same target block of memory cells or to write the data associated with the two or more validity characteristics to the multiple target blocks of memory cells is based at least in part on an input/output pattern for the memory system.

Aspect 6: The method, apparatus, or non-transitory computer-readable medium of any of aspects 1 through 5, where determining whether to write the data associated with the two or more validity characteristics to a same target block of memory cells or to write the data associated with the two or more validity characteristics to the multiple target blocks of memory cells is based at least in part on a resource availability of the memory system.

Aspect 7: The method, apparatus, or non-transitory computer-readable medium of any of aspects 1 through 6, where determining whether to write the data associated with the two or more validity characteristics to a same target block of memory cells or to write the data associated with the two or more validity characteristics to the multiple target blocks of memory cells is based at least in part on a temperature of the memory system.

Aspect 8: The method, apparatus, or non-transitory computer-readable medium of any of aspects 1 through 7, where determining whether to write the data associated with the two or more validity characteristics to a same target block of memory cells or to write the data associated with the two or more validity characteristics to the multiple target blocks of memory cells is based at least in part on a storage density of the block of memory cells, or on a target block storage density, or a combination thereof.

Aspect 9: The method, apparatus, or non-transitory computer-readable medium of any of aspects 1 through 8, further including operations, features, circuitry, logic, means, or instructions, or any combination thereof for determining a target block storage density for the transfer operation based at least in part on one or more operating conditions of the memory system.

Aspect 10: The method, apparatus, or non-transitory computer-readable medium of any of aspects 1 through 9, further including operations, features, circuitry, logic, means, or instructions, or any combination thereof for selecting the block of memory cells for the transfer operation based at least in part on an amount of the data that is associated with a validity characteristic of the two or more validity characteristics.

Aspect 11: The method, apparatus, or non-transitory computer-readable medium of aspect 10, further including operations, features, circuitry, logic, means, or instructions, or any combination thereof for determining the amount of the data that is associated with the validity characteristic based at least in part on reading a data quantity indicator for the validity characteristic that corresponds to the block of memory cells.

Aspect 12: The method, apparatus, or non-transitory computer-readable medium of any of aspects 1 through 11, further including operations, features, circuitry, logic, means, or instructions, or any combination thereof for selecting the block of memory cells for the transfer operation based at least in part on a duration that the data, or a portion thereof, has been stored in the block of memory cells.

Aspect 13: The method, apparatus, or non-transitory computer-readable medium of any of aspects 1 through 12, further including operations, features, circuitry, logic, means, or instructions, or any combination thereof for selecting the block of memory cells for the transfer operation based at least in part on a quantity of erase cycles associated with the block of memory cells.

Aspect 14: The method, apparatus, or non-transitory computer-readable medium of any of aspects 1 through 13, further including operations, features, circuitry, logic, means, or instructions, or any combination thereof for writing indications of the two or more validity characteristics associated with respective portions of the data to a logical-to-physical address mapping table associated with the block of memory cells Aspect 15: The method, apparatus, or non-transitory computer-readable medium of any of aspects 1 through 14, further including operations, features, circuitry, logic, means, or instructions, or any combination thereof for updating a validity characteristic associated with at least a portion of the data based at least in part on a duration of validity of the at least the portion of the data at the memory system.

Aspect 16: The method, apparatus, or non-transitory computer-readable medium of any of aspects 1 through 15, where each validity characteristic of the two or more validity characteristics is associated with a respective data validity duration.

Aspect 17: The method, apparatus, or non-transitory computer-readable medium of any of aspects 1 through 16, where each validity characteristic of the two or more validity characteristics is associated with a respective data type.

Aspect 18: The method, apparatus, or non-transitory computer-readable medium of any of aspects 1 through 17, where each validity characteristic of the two or more validity characteristics is associated with a respective stream identifier.

FIG. 6 illustrates a flowchart showing a method 600 that supports data separation configurations for memory systems in accordance with examples as disclosed herein. The operations of method 600 may be implemented by a memory system or its components as described herein. For example, the operations of method 600 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 605, the method may include writing data associated with two or more validity characteristics to a block of memory cells of a memory system. In some examples, aspects of the operations of 605 may be performed by a write component 425 as described with reference to FIG. 4.

At 610, the method may include determining, for a transfer operation, whether to transfer the data associated with the two or more validity characteristics or to transfer a portion of the data associated with fewer than all of the two or more validity characteristics. In some examples, aspects of the operations of 610 may be performed by a determination component 430 as described with reference to FIG. 4.

At 615, the method may include performing the transfer operation based at least in part on the determination. In some examples, aspects of the operations of 615 may be performed by a transfer component 435 as described with reference to FIG. 4.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 19: A method, apparatus, or non-transitory computer-readable medium including operations, features, circuitry, logic, means, or instructions, or any combination thereof for writing data associated with two or more validity characteristics to a block of memory cells of a memory system; determining, for a transfer operation, whether to transfer the data associated with the two or more validity characteristics or to transfer a portion of the data associated with fewer than all of the two or more validity characteristics; and performing the transfer operation based at least in part on the determination.

Aspect 20: The method, apparatus, or non-transitory computer-readable medium of aspect 19, where performing the transfer operation includes operations, features, circuitry, logic, means, or instructions, or any combination thereof for invalidating the portion of the data in the block of memory cells, based at least in part on determining to transfer the portion of the data, after transferring the portion of the data to a second block of memory cells of the memory system and maintaining the validity of a second portion of the data, associated with at least one validity characteristic of the two or more validity characteristics, in the block of memory cells.

Aspect 21: The method, apparatus, or non-transitory computer-readable medium of any of aspects 19 through 20, where performing the transfer operation includes operations, features, circuitry, logic, means, or instructions, or any combination thereof for writing at least a portion of the data to a target block that corresponds to a validity characteristic of the two or more validity characteristics that corresponds to the at least a portion of the data Aspect 22: The method, apparatus, or non-transitory computer-readable medium of any of aspects 19 through 21, where determining whether to transfer the data associated with the two or more validity characteristics or to transfer the portion of the data associated with fewer than all of the two or more validity characteristics is based at least in part on one or more operating conditions of the memory system.

Aspect 23: The method, apparatus, or non-transitory computer-readable medium of any of aspects 19 through 22, where determining whether to transfer the data associated with the two or more validity characteristics or to transfer the portion of the data associated with fewer than all of the two or more validity characteristics is based at least in part on an amount of available space of a set of one or more blocks of memory cells that includes the block of memory cells.

Aspect 24: The method, apparatus, or non-transitory computer-readable medium of any of aspects 19 through 23, where determining whether to transfer the data associated with the two or more validity characteristics or to transfer the portion of the data associated with fewer than all of the two or more validity characteristics is based at least in part on an input/output pattern for the memory system.

Aspect 25: The method, apparatus, or non-transitory computer-readable medium of any of aspects 19 through 24, where determining whether to transfer the data associated with the two or more validity characteristics or to transfer the portion of the data associated with fewer than all of the two or more validity characteristics is based at least in part on a resource availability of the memory system.

Aspect 26: The method, apparatus, or non-transitory computer-readable medium of any of aspects 19 through 25, where determining whether to transfer the data associated with the two or more validity characteristics or to transfer the portion of the data associated with fewer than all of the two or more validity characteristics is based at least in part on a temperature of the memory system.

Aspect 27: The method, apparatus, or non-transitory computer-readable medium of any of aspects 19 through 26, where determining whether to transfer the data associated with the two or more validity characteristics or to transfer the portion of the data associated with fewer than all of the two or more validity characteristics is based at least in part on a storage density of the block of memory cells, or on a target block storage density, or a combination thereof.

Aspect 28: The method, apparatus, or non-transitory computer-readable medium of any of aspects 19 through 27, further including operations, features, circuitry, logic, means, or instructions, or any combination thereof for determining a target block storage density for the transfer operation based at least in part on one or more operating conditions of the memory system.

Aspect 29: The method, apparatus, or non-transitory computer-readable medium of any of aspects 19 through 28, further including operations, features, circuitry, logic, means, or instructions, or any combination thereof for selecting the block of memory cells for the transfer operation based at least in part on an amount of the data that is associated with a validity characteristic of the two or more validity characteristics.

Aspect 30: The method, apparatus, or non-transitory computer-readable medium of aspect 29, further including operations, features, circuitry, logic, means, or instructions, or any combination thereof for determining the amount of the data that is associated with the validity characteristic based at least in part on reading a data quantity indicator for the validity characteristic that corresponds to the block of memory cells.

Aspect 31: The method, apparatus, or non-transitory computer-readable medium of any of aspects 19 through 30, further including operations, features, circuitry, logic, means, or instructions, or any combination thereof for selecting the block of memory cells for the transfer operation based at least in part on a duration that the data, or a portion thereof, has been stored in the block of memory cells.

Aspect 32: The method, apparatus, or non-transitory computer-readable medium of any of aspects 19 through 31, further including operations, features, circuitry, logic, means, or instructions, or any combination thereof for selecting the block of memory cells for the transfer operation based at least in part on a quantity of erase cycles associated with the block of memory cells.

Aspect 33: The method, apparatus, or non-transitory computer-readable medium of any of aspects 19 through 32, further including operations, features, circuitry, logic, means, or instructions, or any combination thereof for writing indications of the two or more validity characteristics associated with respective portions of the data to a logical-to-physical address mapping table associated with the block of memory cells.

Aspect 34: The method, apparatus, or non-transitory computer-readable medium of any of aspects 19 through 33, further including operations, features, circuitry, logic, means, or instructions, or any combination thereof for updating a validity characteristic associated with at least the portion of the data based at least in part on a duration of validity of the at least the portion of the data.

Aspect 35: The method, apparatus, or non-transitory computer-readable medium of any of aspects 19 through 34, where each validity characteristic of the two or more validity characteristics is associated with a respective data validity duration.

Aspect 36: The method, apparatus, or non-transitory computer-readable medium of any of aspects 19 through 35, where each validity characteristic of the two or more validity characteristics is associated with a respective data type.

Aspect 37: The method, apparatus, or non-transitory computer-readable medium of any of aspects 19 through 36, where each validity characteristic of the two or more validity characteristics is associated with a respective stream identifier.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically eras- able programmable read-only memory (EEPROM), com- pact disk (CD) ROM or other optical disk storage, magnetic disk storage or other magnetic storage devices, or any other non-transitory medium that can be used to carry or store desired program code means in the form of instructions or data structures and that can be accessed by a general- purpose or special-purpose computer, or a general-purpose or special-purpose processor. Also, any connection is prop- erly termed a computer-readable medium. For example, if the software is transmitted from a website, server, or other remote source using a coaxial cable, fiber optic cable, twisted pair, digital subscriber line (DSL), or wireless tech- nologies such as infrared, radio, and microwave, then the coaxial cable, fiber optic cable, twisted pair, DSL, or wire- less technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
one or more memory devices of a memory system; and
a controller of the memory system coupled with the one or more memory devices and configured to cause the apparatus to:
write data associated with two or more different valid- ity characteristics to a block of memory cells of the one or more memory devices;
determine, for a transfer operation to transfer the data associated with the two or more different validity characteristics from the block of memory cells, whether to write the data associated with the two or more different validity characteristics to a same target block of memory cells of the one or more memory devices or to write the data associated with the two or more different validity characteristics to multiple target blocks of memory cells of the one or more memory devices each corresponding to a respective validity characteristic of the two or more different validity characteristics; and
perform the transfer operation based at least in part on the determination.

2. The apparatus of claim 1, wherein, to perform the transfer operation, the controller is configured to cause the apparatus to:
write, based at least in part on determining to write the data associated with the two or more different validity characteristics to the multiple target blocks of memory cells, a first portion of the data associated with a first validity characteristic of the two or more different validity characteristics to a first target block that corresponds to the first validity characteristic, and a sec- ond portion of the data associated with a second validity characteristic of the two or more different validity characteristics to a second target block that corresponds to the second validity characteristic.

3. The apparatus of claim 1, wherein the controller is configured to cause the apparatus to:
determine whether to write the data associated with the two or more different validity characteristics to the same target block of memory cells or to write the data associated with the two or more different validity characteristics to the multiple target blocks of memory cells based at least in part on one or more operating conditions of the memory system.

4. The apparatus of claim 1, wherein the controller is configured to cause the apparatus to:
determine whether to write the data associated with the two or more different validity characteristics to the same target block of memory cells or to write the data associated with the two or more different validity characteristics to the multiple target blocks of memory cells based at least in part on an amount of available space of a set of one or more blocks of memory cells that includes the block of memory cells.

5. The apparatus of claim 1, wherein the controller is configured to cause the apparatus to:
determine whether to write the data associated with the two or more different validity characteristics to the same target block of memory cells or to write the data associated with the two or more different validity characteristics to the multiple target blocks of memory cells based at least in part on an input/output pattern for the memory system.

6. The apparatus of claim 1, wherein the controller is configured to cause the apparatus to:
determine whether to write the data associated with the two or more different validity characteristics to the same target block of memory cells or to write the data associated with the two or more different validity characteristics to the multiple target blocks of memory cells based at least in part on a resource availability of the memory system.

7. The apparatus of claim 1, wherein the controller is configured to cause the apparatus to:
determine whether to write the data associated with the two or more different validity characteristics to the same target block of memory cells or to write the data associated with the two or more different validity characteristics to the multiple target blocks of memory cells based at least in part on a temperature of the memory system.

8. The apparatus of claim 1, wherein the controller is configured to cause the apparatus to:
determine whether to write the data associated with the two or more different validity characteristics to the same target block of memory cells or to write the data associated with the two or more different validity characteristics to the multiple target blocks of memory cells based at least in part on a storage density of the block of memory cells, or on a target block storage density, or a combination thereof.

9. The apparatus of claim 1, wherein the controller is further configured to cause the apparatus to:
determine a target block storage density for the transfer operation based at least in part on one or more oper- ating conditions of the memory system.

10. The apparatus of claim 1, wherein the controller is further configured to cause the apparatus to:

select the block of memory cells for the transfer operation based at least in part on an amount of the data that is associated with a validity characteristic of the two or more different validity characteristics.

11. The apparatus of claim 10, wherein the controller is further configured to cause the apparatus to:

determine the amount of the data that is associated with the validity characteristic based at least in part on reading a data quantity indicator for the validity characteristic that corresponds to the block of memory cells.

12. The apparatus of claim 1, wherein the controller is further configured to cause the apparatus to:

select the block of memory cells for the transfer operation based at least in part on a duration that the data has been stored in the block of memory cells.

13. The apparatus of claim 1, wherein the controller is further configured to cause the apparatus to:

select the block of memory cells for the transfer operation based at least in part on a quantity of erase cycles associated with the block of memory cells.

14. The apparatus of claim 1, wherein the controller is further configured to cause the apparatus to:

write indications of the two or more different validity characteristics associated with respective portions of the data to a logical-to-physical address mapping table associated with the block of memory cells.

15. The apparatus of claim 1, wherein the controller is further configured to cause the apparatus to:

update a validity characteristic associated with at least a portion of the data based at least in part on a duration of validity of the at least the portion of the data at the memory system.

16. The apparatus of claim 1, wherein each validity characteristic of the two or more different validity characteristics is associated with a respective data validity duration, or with a respective data type.

17. The apparatus of claim 1, wherein each validity characteristic of the two or more different validity characteristics is associated with a respective stream identifier.

18. An apparatus, comprising:

one or more memory devices of a memory system; and a controller of the memory system coupled with the one or more memory devices and configured to cause the apparatus to:

write data associated with two or more different validity characteristics to a block of memory cells of the one or more memory devices;

determine, for a transfer operation, whether to transfer the data associated with the two or more different validity characteristics or to transfer a portion of the data associated with fewer than all of the two or more different validity characteristics; and perform the transfer operation based at least in part on the determination.

19. The apparatus of claim 18, wherein, to perform the transfer operation, the controller is configured to cause the apparatus to:

invalidate the portion of the data in the block of memory cells, based at least in part on determining to transfer the portion of the data, after transferring the portion of the data to a second block of memory cells of the one or more memory devices; and maintain a validity of a second portion of the data, associated with at least one validity characteristic of the two or more different validity characteristics, in the block of memory cells.

20. A non-transitory computer-readable medium storing code comprising instructions which, when executed by a processor of an electronic device, cause the electronic device to:

write data associated with two or more different validity characteristics to a block of memory cells of the electronic device;

determine, for a transfer operation to transfer the data associated with the two or more different validity characteristics from the block of memory cells, whether to write the data associated with the two or more different validity characteristics to a same target block of memory cells of the electronic device or to write the data associated with the two or more different validity characteristics to multiple target blocks of memory cells of the electronic device each corresponding to a respective validity characteristic of the two or more different validity characteristics; and perform the transfer operation based at least in part on the determination.

* * * * *